Oct. 9, 1928.
L. C. WETZEL
1,686,779
WEIGHING SCALE
Filed Feb. 25, 1924
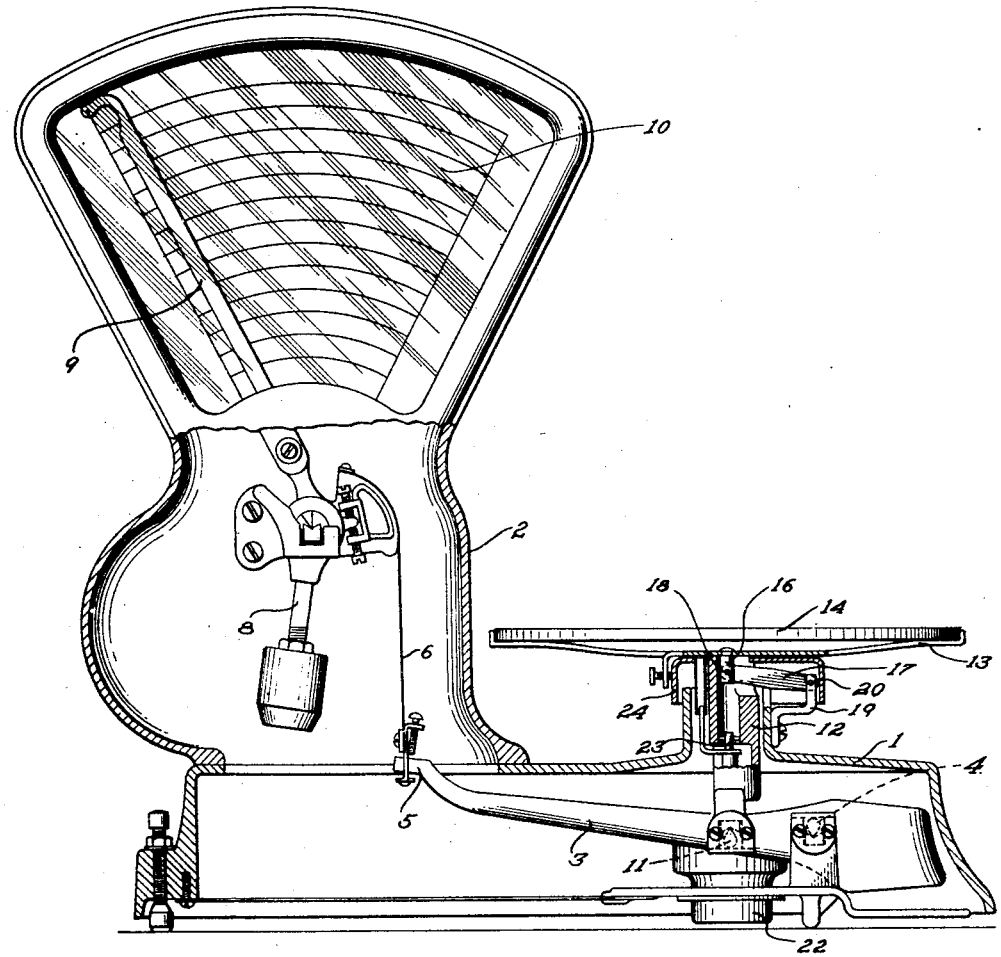
Inventor
LEWIS C. WETZEL.
By C. O. Marshall
Attorney Patented Oct. 9, 1928.

1,686,779

UNITED STATES PATENT OFFICE.

LEWIS C. WETZEL, OF WINDSOR, ONTARIO, CANADA, ASSIGNOR TO TOLEDO SCALE COMPANY, OF TOLEDO, OHIO, A CORPORATION OF NEW JERSEY.

WEIGHING SCALE.

Application filed February 25, 1924. Serial No. 694,867.

This invention relates to weighing scales, and one of its principal objects is to improve the means employed for preventing the commodity receiver or platform from tipping when a load is placed adjacent one of its edges.

Another object of my invention is to provide stabilizing means for scale platforms which is adaptable for use in scales having enclosed lever mechanism, particularly those of the type employing only one platform supporting lever.

Still another object is the provision of a device of this character which may be economically manufactured and readily assembled in the scale and which is capable of easy removal for purposes of inspection or repair.

Other objects and advantages will be apparent from the following description, in which reference is had to the accompanying drawing illustrating a preferred embodiment of my invention and wherein similar reference numerals designate similar parts.

In the drawing:

The figure is a front elevational view of a scale embodying my invention, parts being shown in section to more clearly delineate the novel features of my invention.

The scale illustrated in the figure is of the well known automatic fan type having a base housing 1 upon which is mounted an upright housing 2, the upper end of which is substantially fan shaped. In this particular type of scale the main or platform lever 3 is fulcrumed on suitable bearings within the base housing 1, the nose 5 of the lever 3 being connected by means of a flexible metallic ribbon 6 to the power sector of the load-counterbalancing pendulum 8 which is provided with an indicating arm 9 that swings over a suitable chart 10 located in the fan-shaped portion of the upright housing 2.

Mounted upon the pivots 11 fixed in the lever 3 is a member 12 upon the upper extremity of which is fixed a spider 13 which in turn supports a commodity receiver or platform 14. The member 12 is bored to provide clearance for a stud 16 fixedly secured to the spider 13, said stud having a kerf or slot which receives one end of a link 17 loosely pivoted therein by means of a pintle 18. The other extremity of the link is pivoted by means of a pintle 20 to a bracket 19 fixed to an upwardly projecting portion of the base housing 1.

The parts are so proportioned and arranged that lines connecting the pivots 4 and 11 and pintles 18 and 20 respectively form a parallelogram. When the load pivot 11 is swung about the fulcrum pivot 4 the pintle 18 swings about the pintle 20 to the same extent and the platform is kept level throughout weighing movements of the scale. With the pivotal points 4, 11, 18 and 20 in parallelogrammatic relation, the effect of a load on the automatic load-counterbalancing mechanism will not be affected by a change in position of the load on the scale platform.

I have provided means for dampening the vibrations of the weighing mechanism consisting of a dash pot 22, the plunger rod 23 being connected to the member 12 for operation therewith. A dust protecting member 24 in the form of an inverted cup is positioned beneath the spider 13 and is relatively movable thereto for purposes of adjusting the dash pot, the details of which, forming no part of my invention, will not be described.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a supporting frame, a lever fulcrumed on said supporting frame and having a load pivot, a commodity receiver supported upon said load pivot, and a link positioned substantially above said lever and pivotally connecting said commodity receiver with said frame, the axes of the pivotal connections between said link, the commodity receiver and frame and the load and fulcrum pivots being in parallelogrammatic relation and arranged so that said pivotal axes lie in substantially vertical planes.

2. In a device of the class described, in combination, a frame, a lever fulcrumed on said frame and having a load pivot, a commodity receiver supported upon said load pivot, and a link positioned between the commodity receiver and said lever and pivotally connecting said commodity receiver with said frame, the axes of the pivotal connections between said link, the commodity receiver and frame and the load and fulcrum pivots being in parallelogrammatic relation.

3. In a device of the class described, in combination, a frame, a lever fulcrumed on said frame and having a load pivot, a commodity receiver supported upon said load pivot, and a link positioned between the commodity receiver and said lever and pivotally connecting said commodity receiver with said frame, the axes of the pivotal connections between said link, the commodity receiver and frame and the load and fulcrum pivots being in parallelogrammatic relation, said parts being so arranged that said pivotal axes lie in substantially vertical planes.

4. In a device of the class described, in combination, a base housing, a lever fulcrumed therein and having a load pivot, a member mounted on said load pivot, a commodity-receiving platform supported by said member, and a link positioned between the lever and the commodity-receiving platform and pivotally connecting said member with said base housing, the axes of the pivotal connections between said link, the base housing and said member and the load and fulcrum pivots being in parallelogrammatic relation.

5. In a weighing scale, in combination, a base housing, a lever fulcrumed within said housing and having a load pivot, a commodity receiver mounted upon said load pivot, and a link positioned between the commodity receiver and said lever and pivotally connecting said commodity receiver with said base housing, the axes of the pivotal connections between said link, the base housing and said commodity receiver and the load and fulcrum pivots being in parallelogrammatic relation.

6. In a weighing scale, in combination, a frame, a lever fulcrumed upon said frame and having a load pivot, a commodity-receiver supported upon said load pivot, a link positioned between said commodity-receiver and said lever and pivotally connecting said commodity-receiver with said frame, the axes of the pivotal connections of the link between said commodity-receiver and frame and the load and fulcrum pivots being in parallelogrammatic relation, said lever having an end extending laterally to a point beyond the edge of said commodity-receiver, automatic weighing and indicating mechanism located above said commodity-receiver, and means connecting said automatic weighing and indicating mechanism to the laterally extended end of said lever.

LEWIS C. WETZEL.